United States Patent
Zhang

(10) Patent No.: US 12,339,642 B2
(45) Date of Patent: Jun. 24, 2025

(54) ON-MACHINE MONITORING SYSTEM FOR FAILURE STATE OF ROTATING TOOL AND DETECTION METHOD THEREFOR

(71) Applicant: Shanghai Weiyan Precision Technology Co., Ltd, Shanghai (CN)

(72) Inventor: Xi Zhang, Shanghai (CN)

(73) Assignee: Shanghai Weiyan Precision Technology Co., Ltd, Shanghai (CN)

( * ) Notice: Subject to any disclaimer, the term of this patent is extended or adjusted under 35 U.S.C. 154(b) by 442 days.

(21) Appl. No.: 17/800,998

(22) PCT Filed: Jul. 5, 2021

(86) PCT No.: PCT/CN2021/104497
§ 371 (c)(1),
(2) Date: Aug. 19, 2022

(87) PCT Pub. No.: WO2022/022232
PCT Pub. Date: Feb. 3, 2022

(65) Prior Publication Data
US 2023/0096314 A1 Mar. 30, 2023

(30) Foreign Application Priority Data
Jul. 27, 2020 (CN) .......................... 202010731121.9

(51) Int. Cl.
*G05B 19/4065* (2006.01)
*B23Q 17/24* (2006.01)

(52) U.S. Cl.
CPC ..... *G05B 19/4065* (2013.01); *B23Q 17/2457* (2013.01); *G05B 2219/37226* (2013.01); *G05B 2219/50185* (2013.01)

(58) Field of Classification Search
CPC ...... G05B 19/4065; G05B 2219/37226; G05B 2219/50185; G05B 2219/37206;
(Continued)

(56) References Cited

U.S. PATENT DOCUMENTS

| 4,959,824 A * | 9/1990 | Ueda ..................... G11B 7/1376 |
| 2006/0007981 A1* | 1/2006 | Clary ....................... G02B 9/34 |
| | | 372/107 |

(Continued)

FOREIGN PATENT DOCUMENTS

| CN | 201109050 Y | 9/2008 |
| CN | 102528561 A | 7/2012 |

(Continued)

OTHER PUBLICATIONS

Kerr, D., Pengilley, J. and Garwood, R., 2006. Assessment and visualisation of machine tool wear using computer vision. The International Journal of Advanced Manufacturing Technology, 28, pp. 781-791. (Year: 2006).*

(Continued)

*Primary Examiner* — Alicia M. Choi
(74) *Attorney, Agent, or Firm* — KIRTON McCONKIE; Evan R. Witt

(57) ABSTRACT

An on-machine monitoring system for the failure state of the rotating tool and a detection method thereof are provided. The monitoring system includes a detector, a data processing controller, a tool data server, and a Hall current sensor. A tool diameter and a tool length are determined according to image sequences of a tool. A wear state and a breakage state of the tool are determined according to the tool diameter and the tool length. A spindle current signal is acquired by the Hall current sensor. And an edge chipping state and a breaking state of the tool are determined according to the spindle current signal.

19 Claims, 4 Drawing Sheets

(58) Field of Classification Search
CPC .......... G05B 2219/37256; G05B 2219/37555; G05B 2219/37042; G05B 2219/37084; G05B 19/404; B23Q 17/2457; B23Q 17/0957; B23Q 17/0961; B23Q 17/2461; B23Q 17/2466; B23Q 17/249; B23Q 17/09

See application file for complete search history.

(56) References Cited

U.S. PATENT DOCUMENTS

| | | | | |
|---|---|---|---|---|
| 2010/0286812 | A1* | 11/2010 | Slettemoen | G01B 21/045 700/173 |
| 2011/0317909 | A1* | 12/2011 | Jeyaraman | B23Q 17/2457 382/152 |
| 2016/0316551 | A1* | 10/2016 | Kurosawa | H01S 3/2325 |
| 2018/0272491 | A1* | 9/2018 | Yang | B23Q 17/0971 |
| 2018/0299865 | A1* | 10/2018 | Holmstrom | G05B 19/4065 |
| 2021/0173379 | A1* | 6/2021 | Hedin | G01M 13/045 |
| 2021/0379718 | A1* | 12/2021 | Van Sprang | B23Q 17/0966 |
| 2022/0250201 | A1* | 8/2022 | Jacot | B23Q 17/2457 |

FOREIGN PATENT DOCUMENTS

| | | |
|---|---|---|
| CN | 102528562 A | 7/2012 |
| CN | 102581700 A | 7/2012 |
| CN | 107532886 A | 1/2018 |
| CN | 111300144 A | 6/2020 |
| CN | 111830906 A | 10/2020 |
| JP | 2007152531 A | 6/2007 |
| JP | 2007268646 A | 10/2007 |
| JP | 2012093243 A | 5/2012 |
| KR | 101498999 B1 | 3/2015 |
| WO | 2010079652 A1 | 7/2010 |
| WO | 2012053645 A1 | 4/2012 |
| WO | WO-2020090844 A1 * | 5/2020 ............. B23Q 17/22 |

OTHER PUBLICATIONS

Bhat, N.N., Dutta, S., Pal, S.K. and Pal, S., 2016. Tool condition classification in turning process using hidden Markov model based on texture analysis of machined surface images. Measurement, 90, pp. 500-509. (Year: 2016).*

Jurkovic, J., Korosec, M. and Kopac, J., 2005. New approach in tool wear measuring technique using CCD vision system. International Journal of Machine Tools and Manufacture, 45(9), pp. 1023-1030. (Year: 2005).*

Jiang Yong, Research on the tool wear detection method for micro milling, Machine Design and Manufacturing Engineering, Aug. 2017, vol. 46. No. 8.

Yu-Teng Liang et al., Vision-Based Automatic Tool Wear Monitoring System, 7th World Congress on Intelligent control and Automation, Jun. 2008.

AMing Ge Ge Data Area. Vision Based Tool Monitor, Personal Library 360doc.com. URL: www.360doc.com/content/19/0727/06/29968938_851247415.shtml., Jul. 27, 2019, pp. 3-12 and 18-19.

* cited by examiner

ON-MACHINE MONITORING SYSTEM FOR FAILURE STATE OF ROTATING TOOL AND DETECTION METHOD THEREFOR

CROSS REFERENCE TO RELATED APPLICATION

The present application claims the priority of Chinese Patent Application No. 202010731121.9, filed with the China National Intellectual Property Administration on Jul. 27, 2020, and entitled "ON-MACHINE MONITORING SYSTEM FOR FAILURE STATE OF ROTATING TOOL AND DETECTION METHOD THEREFOR", the entire contents of which are incorporated herein by reference.

TECHNICAL FIELD

The present disclosure relates to the field of on-machine monitoring on a failure state of a rotating tool, and in particular to an on-machine monitoring system for the failure state of the rotating tool and a detection method thereof.

BACKGROUND ART

There are five independent functions, namely tool setting, multi-angle detection on micro tools, tool runout detection, tooth by tooth detection on wear of rake face and flank face, and real-time monitoring on a whole machining process, are involved in an on-machine monitoring of a rotating tool. The first four functions can only be executed before or after the machining process. The fifth function can fulfill real-time monitoring on tool states in a whole numerical control (NC) machining process. These five functions are independent of one another and respectively focus on a specific property of the tool on-machine state. Only the fifth function is studied herein.

In the NC machining process, the tool may failure mainly in a form of tool wear or tool breakage. The tool wear refers to a progressive failure caused by the tool cutting workpieces, and the tool breakage refers to a sudden failure during cutting operation and includes tool edge chipping or breaking. When the failure of the tool occurs, the tool should be replaced in time. If the tool is replaced extremely early, unnecessary tool consumption and production costs are increased. If the tool is replaced extremely late, the workpieces may be out of tolerance or have scratches on a surface; and in a serious case, the operator may be injured, and the machine tool may be damaged. From this, the on-line monitoring on the failure states of the rotating tool such as milling cutter is of great significance. There are three types of techniques available according to nature of detection signals. However, it is difficult for these techniques with the following features and defects to meet requirements of the on-machine monitoring of the failure states of a large number of rotating tools used in production.

(1) In an indirect measurement method, the tool states are inferred by measuring physical quantities intrinsically related to the tool wear and the tool breakage, such as signals about vibration of worktable, spindle current, cutting force, and acoustic emission. For the tool breakage, changes of associated signals caused by it are generally obvious, and therefore, a detection technology for the tool breakage has been relatively mature. For the tool wear, although the tool wear can be detected in real time in a harsh machining process through the existing indirect measurement method, sensitivity and accuracy of a measurement cannot meet the requirements due to complexity of the machining process and progressivity of a wear process, and as a result, false alarms or false negative alarms are likely to be caused. Moreover, a monitoring system is not universal for different processing conditions.

(2) In a direct measurement method, the tool failure is detected by measuring a change of a cutting edge in size or shape. The direct measurement method includes an optical image method and a laser detection method. The optical image method has advantages of high measurement accuracy, visualization, and universality. Nevertheless, in the optical image method, a spindle is required to stop rotating, and the tool need to be demounted for off-line detection or are measured on-line by means of manual assistance. Such operations are cumbersome and time-consuming, resulting in a halt in production, which greatly reduces production efficiency. An on-line automatic detection device for the wear state of the rotating tool provides a dual-camera 3D vision technology based on non-telecentric imaging, which can perform a tooth by tooth monitoring on the tool wear under a rotating state. However, a dual-camera detection principle is more complex. It is necessary to utilize a target mounted on the spindle of the machine tool to form a 3D calibration target in a virtual space by means of movements of all axes of the machine tool, so as to fulfill accurate calibration of a camera coordinate system and a machine coordinate system. Then, a 3D model of a maximum swept volume is built for the tool according to rotary constraints. As a result, such a solution causes low measurement efficiency, complex computation, many links that generate measurement errors and low efficiency. In addition, this method limited to a principle of measurement cannot timely respond to sudden failures of the tool during the cutting operation. In the laser detection method, based on a principle of single-point measurement of laser occlusion, the tool wear and the tool breakage are inferred by the change of the tool in size. However, the laser detection method cannot timely respond to the sudden failures of the tools during the cutting operation either.

(3) An on-line automatic detection device for the tool wear and the tool breakage of the rotating tool in a whole machining process provides a method combining the direct measurement with the indirect measurement. By combination of the optical image method and the signals from a vibration sensor or an acoustic emission sensor, the detection device can be used to automatically detect the wear state and breakage state of the tool in a case that the tool is in the rotating state within a whole use cycle of the tool, including before, during, and after the cutting operation. Due to adoption of the dual-camera 3D vision technology based on the non-telecentric imaging, it is also necessary to utilize the target mounted on the spindle of the machine tool to form the 3D calibration target in the virtual space by means of the movements, so as to fulfill the accurate calibration of the camera coordinate system and the machine coordinate system. Then, the 3D model of the maximum swept volume is built for the tool according to the rotary constraints. As a result, such a solution causes the low measurement efficiency, complex calibration and computation, and difficult protection for optical paths, and it causes that an optical windows is extremely likely to be polluted in the actual machining process and cannot work reliably.

SUMMARY

The present disclosure intends to provide an on-machine monitoring system for a failure state of a rotating tool and a detection method thereof, in order to solve a problem that an existing on-machine monitoring system for a failure state of a tool cannot fulfill all advantages of sensitivity, universality, measurement efficiency, and real-time monitoring in a whole process, simultaneously.

In order to achieve the above effect, the present disclosure provides the following technical solutions.

An on-machine monitoring system for a failure state of a rotating tool includes a detector, a data processing controller, a tool data server, and a Hall current sensor, where the data processing controller is connected to the detector through a signal cable and also connected to a computer numerical control (CNC) controller, the tool data server, and the Hall current sensor; the Hall current sensor is configured to sense a spindle current signal; the detector is internally provided with a telecentric lens and a backlight source, the telecentric lens and the backlight source are configured to perform parallel projection on a tool to obtain image sequences of the tool during a rotation process of the tool, the image sequences of the tool are configured to show a variation trend of the tool in size; the size of the tool comprises a tool diameter and a tool length; the data processing controller is configured to monitor the failure state of the tool according to the image sequences of the tool and the spindle current signal; and the failure state of the tool comprises a wear state, a breakage state, an edge chipping state, and a breaking state of the tool.

In an embodiment, the detector comprises a protective shell, a camera module, the telecentric lens, a 45° reflective mirror, an optical window, a pneumatic plunger, and an optical fiber sensor, where the optical fiber sensor comprises a transmitter of the optical fiber sensor and a receiver of the optical fiber sensor; the protective shell is a concave protective shell; a first side cavity of the concave protective shell is internally provided with the camera module, the telecentric lens, the 45° reflective mirror, the optical window, the pneumatic plunger, and the transmitter of the optical fiber sensor, a second side cavity of the concave protective shell is internally provided with the receiver of the optical fiber sensor; the transmitter of the optical fiber sensor and the receiver of the optical fiber sensor are symmetrically arranged with the tool as a center; and the backlight source is arranged in the second side cavity and configured to provide uniform back lighting illumination during imaging to form a tool image with excellent light-dark contrast; and the telecentric lens is arranged at a lens mount of the camera module and has an axis parallel to an axis of the tool; the camera module and the telecentric lens are configured to obtain a parallel projection image of the rotating tool; the 45° reflective mirror is arranged on an upper portion of the telecentric lens and configured to turn an optical imaging path by 90°; the optical window is arranged at a reflecting end of the 45° reflective mirror and configured to seal the camera module, the telecentric lens, and the 45° reflective mirror; the pneumatic plunger at the same optical imaging path as the optical window has an axis perpendicular to a normal direction of a plane of the optical window and is configured to control the camera module to acquire the tool image and protect the optical imaging path.

In an embodiment, pressured air is introduced into the optical imaging path between the optical window and the pneumatic plunger to form positive pressure protection on the optical imaging path between the optical window and the pneumatic plunger.

In an embodiment, a connecting line between the transmitter of the optical fiber sensor and the receiver of the optical fiber sensor is perpendicular to the axis of the tool.

In an embodiment, the detector further includes a cleaning nozzle; and the cleaning nozzle is arranged on a surface of a concave area of the concave protective shell, corresponds to the tool and is configured to clean the tool before the imaging to remove residual chips or cutting fluid on the tool.

In an embodiment, the concave area is provided with a pneumatic protective door.

In an embodiment, the data processing controller comprises a computation module, a light source control module, and an air path control module, where the computation module, the light source control module, and the air path control module are successively connected through signal cables; the computation module and the light source control module are respectively connected to the signal cables; the computation module is further connected to the CNC controller, connected to the tool data server through a workshop network, connected to the Hall current sensor, and configured to control the Hall current sensor to acquire the spindle current signal.

In an embodiment, the present disclosure further includes a cleaning air tube, a plunger air tube, and a positive pressure protection air tube, where the cleaning air tube is configured to connect the cleaning nozzle to the air path control module;

the plunger air tube is configured to connect the pneumatic plunger to the air path control module; and the positive pressure protection air tube is configured to connect the pressured air in the optical imaging path to the air path control module.

A detection method for a failure state of a rotating tool based on an on-machine monitoring system for a failure state of a rotating tool, includes:

step 1: turning on a power supply to make a kernel program in the computation module start automatically and wait for measurement, where the pneumatic plunger is normally closed, and the positive pressure protection is executed all the time;

step 2: running a measurement macro program in a main numerical control (NC) machining program by a machine tool operator in a manner of subroutine calling, and transferring parameters during calling the measurement macro program, where the transferred parameters indicate a specific cross section for measurement of the tool diameter;

step 3: controlling, by the measurement macro program, the tool to move to an initial detection point, where the initial detection point refers to a fixed position designated by a user and is located at an upper portion of the detector; controlling, by the measurement macro program, the tool to descend from the initial detection point to a concave measurement area in a middle of the shell, where a tip of the tool shields a laser beam emitted by the transmitter of the optical fiber sensor firstly during the descent of the tool to generate a step trigger signal at the receiver of the optical fiber sensor; sending the step trigger signal to the CNC controller of a CNC machine tool to trigger the measurement macro program to run a skip command G31; stopping the descent of the tool based on the skip command G31; and setting a first macro variable to 1 by the measurement macro program;

step 4: querying a value of the first macro variable by the kernel program, and under a condition that the value of the first macro variable is 1, controlling, by the air path control module, the cleaning nozzle to be opened via the cleaning air tube to clean the tool by spraying a pressured air flow; otherwise, keeping waiting;

step 5: controlling, by the measurement macro program, the tool to move to a detection position in front of a field of view of the telecentric lens, wherein the detection position is a focus of the field of view of the telecentric lens, and setting a second macro variable to 1 by the measurement macro program, simultaneously;

step 6: querying a value of the second macro variable by the kernel program, and under a condition that the second macro variable is 1, by the kernel program, controlling the camera module to be opened and turning on the backlight source through the light source control module; otherwise, continuing to clean the tool;

step 7: controlling, by the air path control module, the cleaning nozzle to be closed via the cleaning air tube and the pneumatic plunger to be opened via the plunger air tube, and performing the parallel projection by the camera module on the tool through the telecentric lens during rotation of the tool, to obtain the image sequences of the tool;

step 8: controlling, by the kernel program, the pneumatic plunger to be closed and the backlight source to be turned off through the data processing controller, after shooting is finished, and informing, by the kernel program, the measurement macro program to control the tool to return to the initial detection point, to finish the detection;

step 9: processing the image sequences of the tool, obtained by the camera module and the telecentric lens, by the kernel program to determine the tool length and the tool diameter, wherein the tool length and the tool diameter are used to determine the wear state and the breakage state of the tool;

step 10: acquiring the spindle current signal by means of the Hall current sensor; where the Hall current sensor can be replaced with a cutting force sensor, a vibration sensor, or an acoustic emission sensor; the vibration sensor is configured to acquire acceleration signals in x, y, z directions of a worktable, the acoustic emission sensor is configured to acquire high-frequency sound signals generated by the tool during cutting materials, and the cutting force sensor is configured to acquire cutting force signals in the x, y, z directions generated by the tool during cutting materials; and an edge chipping state and a breaking state of the tool can be determined based on the acceleration signals, the high-frequency sound signals, or the cutting force signals; and step 11, determining the edge chipping state and the breaking state of the tool according to the spindle current signal.

In an embodiment, step 11 includes:

controlling, by the data processing controller, the Hall current sensor to start during a cutting operation to obtain the spindle current signal of the CNC machine tool;

cutting off the spindle current signal according to a sudden change of an amplitude of the spindle current signal, and removing signal curves correspondingly formed when the tool cuts into a material and cuts out of the material to acquire remained signals;

performing Gaussian filtering on the remained signals to determine a filtered waveform; and analyzing the filtered waveform by utilizing a second derivative curvature, to determine whether the filtered waveform has a sharp drop point in the amplitude, or to determine whether peak values of different tool teeth have a significant periodic variation; where under a condition that the filtered waveform has the sharp drop point in the amplitude, determining that a tool breaking occurs; and under a condition that the peak values of the different tool teeth have the significant periodic variation, determining that a tool edge chipping occurs.

Based on the specific embodiments, the present disclosure has the following technical effects: according to the on-machine monitoring system for a failure state of a rotating tool and a detection method thereof, the change of the rotating tool in size can be automatically detected with high efficiency and high accuracy by merely using one camera in a case where the 45° reflective mirror is adopted, so as to monitor a state of progressive wear; the spindle current is monitored by the sensor during the cutting operation to respond significant tool failures such as the tool edge chipping and the tool breaking in time, so that measurement efficiency of the failure state of the tool is improved.

BRIEF DESCRIPTION OF THE DRAWINGS

In order to more clearly illustrate the technical solutions in the embodiments of the present disclosure or in the prior art, the accompanying drawings required in the embodiments will now be described briefly below. Obviously, the accompanying drawings in the following description are merely some embodiments of the present disclosure, and those skilled in the art can obtain other accompanying drawings from these accompanying drawings without any creative efforts.

Figure 1:
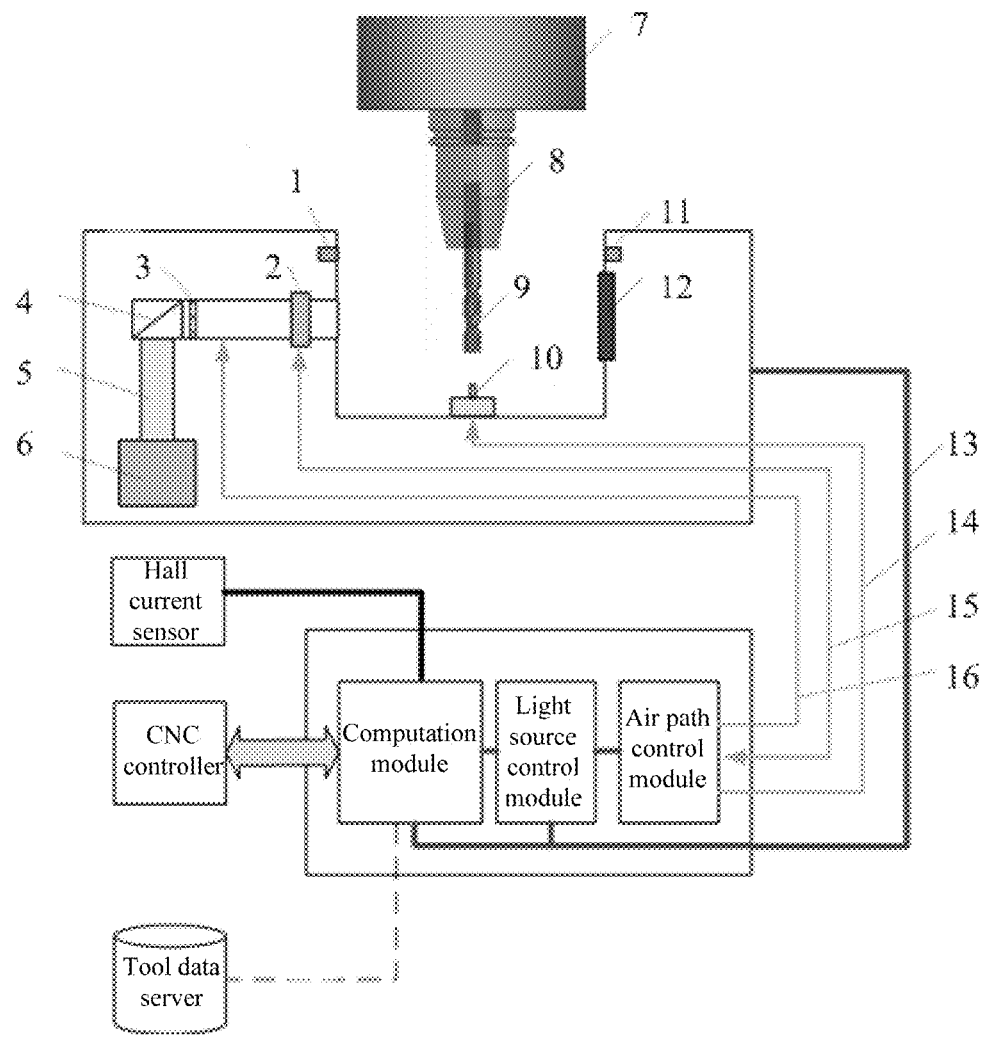
FIG. 1 is a structural diagram of an on-machine monitoring system for a failure state of a rotating tool of the present disclosure.

REFERENCE NUMERALS 1. transmitter of an optical fiber sensor, 2. pneumatic plunger, 3. optical window, 4. 45° reflective mirror, 5. telecentric lens, 6. camera module, 7. spindle, 8. tool holder, 9. tool, 10. cleaning nozzle, 11. receiver of the optical fiber sensor, 12. backlight source, 13. signal cable, 14. cleaning air tube, 15. plunger air tube, 16. positive pressure protection air tube.

DETAILED DESCRIPTION OF THE EMBODIMENTS

The technical solutions of the embodiments of the present disclosure are clearly and completely described below with reference to the accompanying drawings in the embodiments of the present disclosure. Obviously, the described embodiments are merely a part rather than all of the embodiments of the present disclosure. All other embodiments obtained by those skilled in the art based on the embodiments of the present disclosure without any creative efforts shall fall within the scope of the present disclosure.

The present disclosure intends to provide an on-machine monitoring system for a failure state of a rotating tool and a detection method thereof. The on-machine monitoring system and method can monitor a tool state in real time before, during, and after a cutting operation and have advantages of sensitivity, universality, and high efficiency.

For a better understanding of above-mentioned intention, features, and advantages of the present disclosure, the disclosure will be further described in detail below in conjunction with the accompanying drawings and specific implementations thereof.

FIG. 1 shows a structural diagram of the on-machine monitoring system for a failure state of a rotating tool of the present disclosure. As shown in FIG. 1, the on-machine monitoring system for the failure state of the rotating tool includes a detector, a data processing controller, a tool data server, and a Hall current sensor, where the data processing controller is connected to the detector through a signal cable 13 and also connected to a CNC controller, the tool data server, and the Hall current sensor; the Hall current sensor is configured to sense a spindle current signal; the detector is internally provided with a telecentric lens 5 and a backlight source 12, the telecentric lens 5 and the backlight source 12 are configured to perform parallel projection on a tool 9 to obtain image sequences of the tool when the tool 9 rotates, the image sequences of the tool are configured to show a variation trend of the tool in size; the size of the tool includes a tool diameter and a tool length; the data processing controller is configured to monitor the failure state of the tool according to the image sequences of the tool and the spindle current signal; and the failure state of the tool includes a wear state, a breakage state, an edge chipping state, and a breaking state of the tool.

In actual application, the detector particularly includes a protective shell, a camera module 6, the telecentric lens 5, a 45° reflective mirror 4, an optical window 3, a pneumatic plunger 2, and an optical fiber sensor, where the optical fiber sensor includes a transmitter 1 of the optical fiber sensor and a receiver 11 of the optical fiber sensor; the protective shell is a concave protective shell; a first side cavity of the concave protective shell is internally provided with the camera module 6, the telecentric lens 5, the 45° reflective mirror 4, the optical window 3, the pneumatic plunger 2, and the transmitter 1 of the optical fiber sensor, a second side cavity of the concave protective shell is internally provided with the receiver 11 of the optical fiber sensor; the transmitter 1 of the optical fiber sensor and the receiver 11 of the optical fiber sensor are symmetrically arranged with the tool 9 as a center; and the backlight source 12 is arranged in the second side cavity and configured to provide uniform back lighting illumination during imaging to form a tool image with excellent light-dark contrast.

The telecentric lens 5 is arranged at a lens mount of the camera module 6 and has an axis parallel to an axis of the tool; the camera module 6 and the telecentric lens 5 are configured to obtain a parallel projection image of the rotating tool; the 45° reflective mirror 4 is arranged on an upper portion of the telecentric lens 5 and configured to turn an optical imaging path by 90°; the optical window 3 is arranged at a reflecting end of the 45° reflective mirror and configured to seal the camera module 6, the telecentric lens 5, and the 45° reflective mirror 4; the pneumatic plunger 2 at the same optical imaging path as the optical window 3 has an axis perpendicular to a normal direction of a plane of the optical window 3 and is configured to control the camera module 6 to acquire the tool image and protect the optical imaging path.

In actual application, pressured air is introduced into the optical imaging path between the optical window 3 and the pneumatic plunger 2 to form positive pressure protection on the optical imaging path between the optical window 3 and the pneumatic plunger 2.

In actual application, a connecting line between the transmitter 1 of the optical fiber sensor and the receiver 11 of the optical fiber sensor is perpendicular to the axis of the tool 9. The tool 9 is arranged on a tool holder 8, and the tool holder 8 is arranged on a spindle 7.

In actual application, the detector further includes a cleaning nozzle 10; and the cleaning nozzle 10 is arranged on a surface of a concave area of the concave protective shell, corresponds to the tool and is configured to clean the tool before the imaging to remove residual chips or cutting fluids on the tool.

In actual application, the concave area is provided with a pneumatic protective door.

In actual application, the data processing controller particularly includes a computation module, a light source control module, and an air path control module, where the computation module, the light source control module, and the air path control module are successively connected through signal cables; the computation module and the light source control module are respectively connected to the signal cables; the computation module is further connected to the CNC controller, the tool data server through a workshop LAN, and the Hall current sensor to control the Hall current sensor to acquire the spindle current signal.

In actual application, the present disclosure further includes a cleaning air tube 14, a plunger air tube 15, and a positive pressure protection air tube 16, where the cleaning air tube 14 is configured to connect the cleaning nozzle 10 to the air path control module; the plunger air tube 15 is configured to connect the pneumatic plunger 2 to the air path control module; and the positive pressure protection air tube 16 is configured to connect the pressured air in the optical imaging path to the air path control module.

The detector is arranged on a worktable of a CNC machine tool, includes the camera module 6, the telecentric lens 5, the 45° reflective mirror 4, the optical window 3, the pneumatic plunger 2, the optical fiber sensor, the backlight source 12, the cleaning nozzle 10, and the protective shell. The telecentric lens 5 is arranged at the lens mount of the camera module 6 and has the axis parallel to the axis of the tool. The camera module 6 and the telecentric lens 5 are configured to obtain the parallel projection image of the rotating tool. The 45° reflective mirror 4 is arranged on the upper portion of the telecentric lens 5 and configured to turn the optical imaging path by 90° to achieve a more compact structure. The optical window 3 is mounted outside the 45° reflective mirror 4 to seal the foregoing optical components. The pneumatic plunger 2 is located outside an optical path, and has an opening position and a closing position. When the pneumatic plunger 2 is in the opening position, the camera module 6 is allowed to acquire the tool image. When the pneumatic plunger 2 is in the closing position, it provides protection for the optical path. The pressured air is introduced into the optical path between the optical window 3 and the pneumatic plunger 2 and flows outwards via an external fit clearance at a cylindrical surface of the pneumatic plunger 2. Due to resistance of an interior positive pressure air flow, oil mists, the cutting fluid, and the chips in a machining environment of the machine tool are prevented from entering the optical path, so that the optical window 3 and other optical components are not prone to pollution. Accordingly, the positive pressure protection on the optical path between the optical window 3 and the pneumatic plunger 2 is formed. The backlight source 12 is configured to provide the uniform back lighting illumination during the imaging to form the tool image with the excellent light-dark contrast. The optical fiber sensor is configured to ensure safety of a detection process. The connecting line between the transmitter of the optical fiber sensor and the receiver of the optical fiber sensor is perpendicular to the axis of the tool. During descent of the tool, a rough position of a tip of the tool is detected by the optical fiber sensor to prevent collision between the tool and the detector in a case where a clamping length of the tool is unknown. The cleaning nozzle 10 is configured to clean the tool before the imaging to remove the residual chips or cutting fluid on the tool. All the components are mounted in the shell which can protect them. The concave area of the shell provides a measurement space for tool detection.

The data processing controller and the Hall current sensor are mounted in an electrical cabinet of the CNC machine tool. The Hall current sensor is configured to acquire a value of a load current of the spindle 7 of the CNC machine tool, and an obtained current signal is transmitted to an input interface of the controller. The data processing controller includes the computation module, the light source control module, and the air path control module. The computation module is configured to control the camera module 6 and the Hall current sensor to respectively acquire the image and the current signal, and analyze the acquired image and the current signal to determine the failure state of the tool. A light source controller controls on-off of the backlight source 12; and the air path control module controls opening and closing of an air path.

The computation module communicates with the CNC controller of the CNC machine tool via a network port or a serial port by means of a communication protocol. If the tool fails, the CNC controller will alarm. The computation module can also be accessed to the workshop LAN to remotely communicate with the tool data server.

In a case of a change of the above structure, the computation module may be in the form of an embedded hardware, and thus can be integrated into a wear detector. The pneumatic protective door is additionally arranged in the concave area of the shell, and can only be opened during measurement to further protect the real-time on-machine monitoring system for the failure state of the rotating tool, which operates under a worse operating condition.

The Hall current sensor can be replaced with other sensors such as a cutting force sensor, a vibration sensor, and an acoustic emission sensor. If other types of sensors are used, they need to be mounted at a position, close to a cutting operation area, of the worktable of the CNC machine tool.

A kernel program as an executable file compiled and generated by a high-level language runs in the computation module of the data processing controller in an operating system such as a Windows system or a Linux system, The kernel program is mainly used to control the detection process, acquire the image, set an exposure parameter, process the tool image and a sensor signal, analyze the failure state of the tool, and communicate with the CNC controller. The kernel program further includes a database module capable of storing and querying measured data and the image and supporting remote backup of data in a local database to the tool data server through the workshop LAN.

A measurement macro program as an NC subroutine composed of NC programming instructions can be called by a main NC machining program and run in the controller of the CNC machine tool. The measurement macro program is mainly used to detect the tool wear by controlling movement of the tool and the spindle 7 before and after the cutting operation in cooperation with the kernel program. The measurement macro program exchanges data with the kernel program via the network port or the serial port by means of the communication protocol.

The on-machine monitoring system for a failure state of a rotating tool can perform real-time monitoring of the tool state throughout its life cycle before, during, and after the cutting operation. Progressive wear is monitored by automatic detection of the change of the rotating tool in size. An operating principle of the on-machine monitoring system is as follows.

Figure 2:
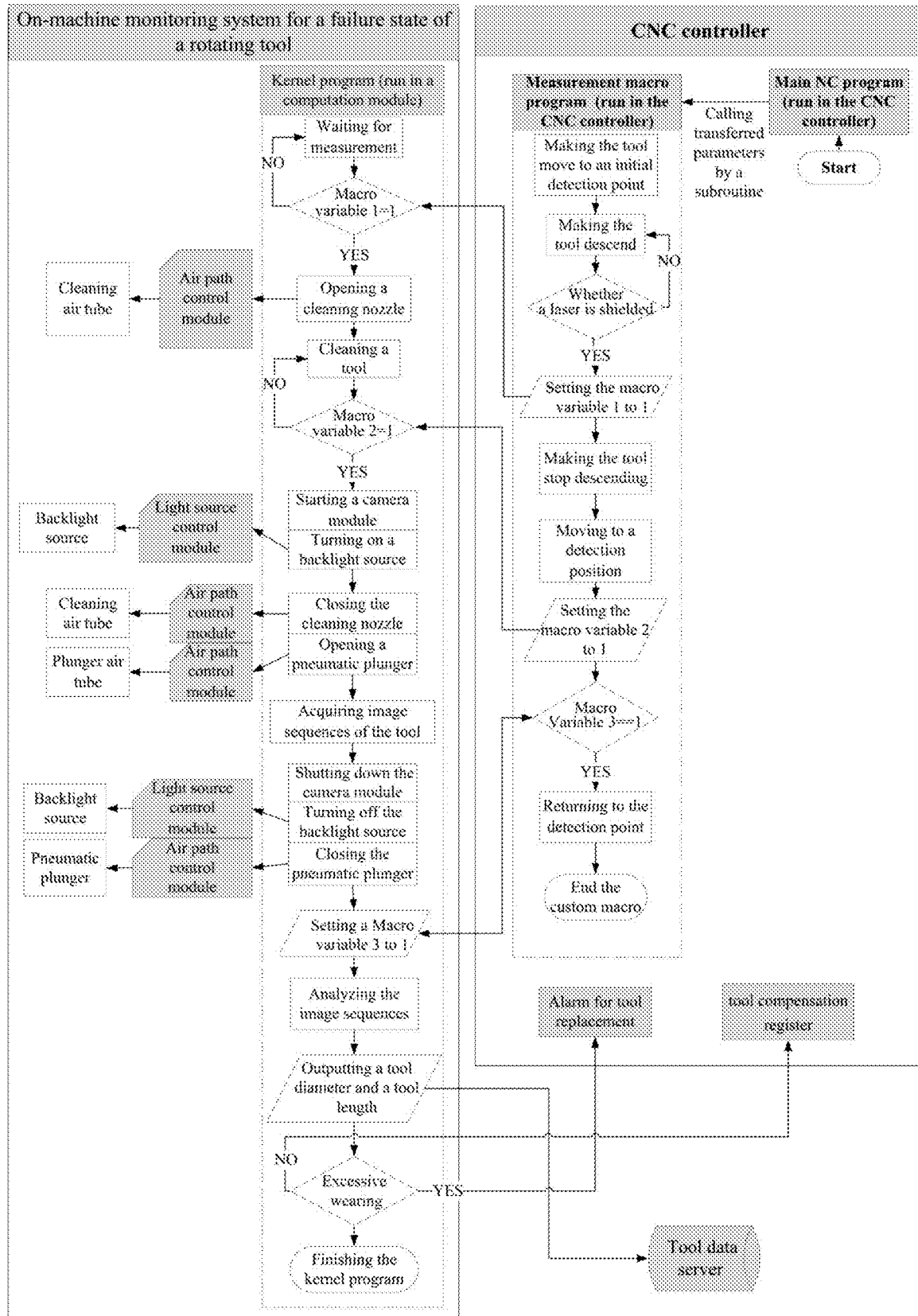
FIG. 2 is a flow chart of a detection method for a failure state of a rotating tool based on the on-machine monitoring system for a failure state of a rotating tool.

FIG. 2 shows a flow chart of the detection method for a failure state of a rotating tool based on the on-machine monitoring system for a failure state of a rotating tool. As shown in FIG. 2, the detection method for the failure state of the rotating tool based on the on-machine monitoring system for the failure state of the rotating tool includes step1 to step1 1.

Step 1: When the system is powered on, the kernel program in the computation module starts automatically and waits for measurement, the pneumatic plunger 2 is normally closed, and the positive pressure protection is executed all the time.

Step 2: The measurement macro program is run in the main NC machining program by a machine tool operator in a manner of subroutine calling, parameters are transferred during calling the measurement macro program, and the transferred parameters indicate a specific cross section for measurement of the tool diameter.

Step 3: The tool is controlled by the measurement macro program to move to an initial detection point, where the initial detection point refers to a fixed position designated by a user and is located at an upper portion of the detector. The tool is controlled by the measurement macro program to descend from the initial detection point to the concave measurement area in the middle of the shell, where the tip of the tool shields a laser beam emitted by the transmitter 1 of the optical fiber sensor firstly during the descent of the tool to generate a step trigger signal at the receiver 11 of the optical fiber sensor, the step trigger signal is sent to the CNC controller of the CNC machine tool to trigger the measurement macro program to run a skip command G31, the descent of the tool is stopped based on the skip command G31, and a first macro variable (macro variable 1) is set to 1 by the measurement macro program.

Step 4: A value of the first macro variable is queried by the kernel program, where if the value of the first macro variable is 1, the cleaning nozzle 10 is controlled by the air path control module to be opened via the cleaning air tube 14 to clean the tool by spraying a pressured air flow; and otherwise, waiting is kept.

Step 5: The tool is controlled by the measurement macro program to move to a detection position in front of a field of view of the telecentric lens 5, where the detection position is a focus of the field of view of the telecentric lens 5, and a second macro variable (macro variable 2) is set to 1 by the measurement macro program, simultaneously.

Step 6: A value of the second macro variable is queried by the kernel program, where if the second macro variable is 1, the camera module 6 is controlled, by the kernel program, to start and the backlight source 12 is turned on through a light source control module; and otherwise, the tool is continued to be cleaned.

Step 7: By the air path control module, the cleaning nozzle 10 is controlled to be closed via the cleaning air tube 14 and the pneumatic plunger 2 is controlled to be opened via the plunger air tube 15, where the camera module 6 performs the parallel projection on the tool through the telecentric lens 5 during rotation of the tool, to obtain the image sequences of the tool.

Step 8: By the kernel program, the pneumatic plunger 2 is controlled to be closed and the backlight source 12 is controlled to be turned off through the data processing controller, after shooting is finished. The measurement macro program is informed by the kernel program to control the tool to return to the initial detection point to finish the detection.

Figure 3:
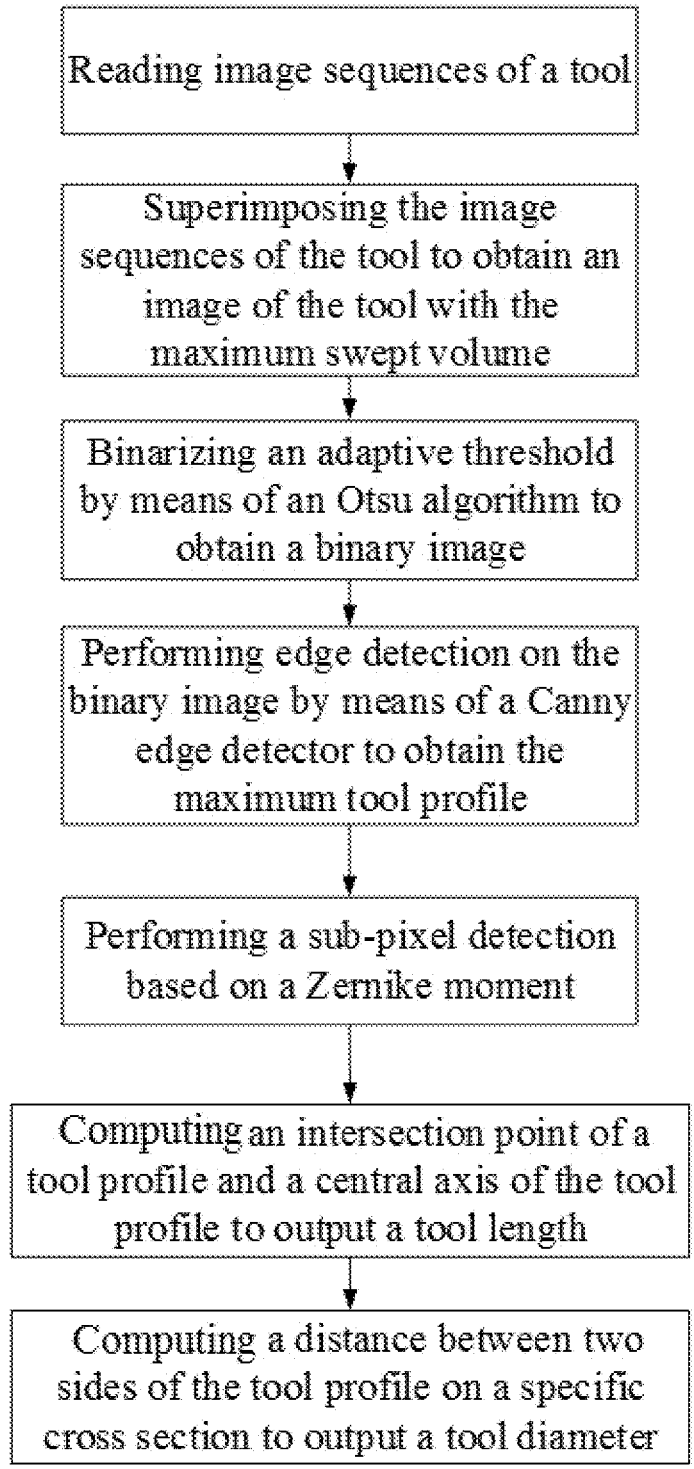
FIG. 3 is a processing flow chart of image sequences of the tool of the present disclosure.

Step 9: The image sequences of the tool obtained by the camera module 6 and the telecentric lens 5 are processed by the kernel program to determine the tool length and the tool diameter, where the tool length and the tool diameter are used to determine the wear state and the breakage state of the tool. FIG. 3 shows a processing flow chart of the image sequences of the tool of the present disclosure. As shown in FIG. 3, (1) the image sequences of the tool are superimposed firstly, that is, areas, containing the tool, of the image are merged to eliminate influence of the spiral flute of the tool, so as to obtain an image of the tool with a maximum swept volume; (2) an adaptive threshold of this image is binarized by means of an Otsu algorithm to obtain a binary image, and edge detection is performed on the binary image by means of a Canny edge detector to obtain the maximum tool profile; and in order to improve measurement accuracy, based on a pixel-level profile, a sub-pixel edge is extracted by means of a Zernike moment; (3) an intersection point of the tool profile and a central axis of the tool profile is analyzed, the tool length may be computed according to the distance from the intersection point to a first line of the image; and (4) based on parameters transferred by the measurement macro program, the tool diameter may be obtained by computing the distance between two sides of the tool profile on the indicated cross section.

If the tool length or the tool diameter exceeds a threshold relative to the first measured value, it indicates that the change of the tool in size caused by the wear is too large, and in this case, the kernel program gives an alarm on the CNC controller of the CNC machine tool via a communication interface of the controller to prompt replacement of the tool; and otherwise, the tool length and the tool diameter are transmitted to a tool compensation register of the CNC controller via the communication interface of the controller for wear compensation of the tool in size.

Step 10: The spindle current signal is acquired by means of the Hall current sensor.

Step 11: The edge chipping state and the breaking state of the tool are determined according to the spindle current signal.

Figure 4:
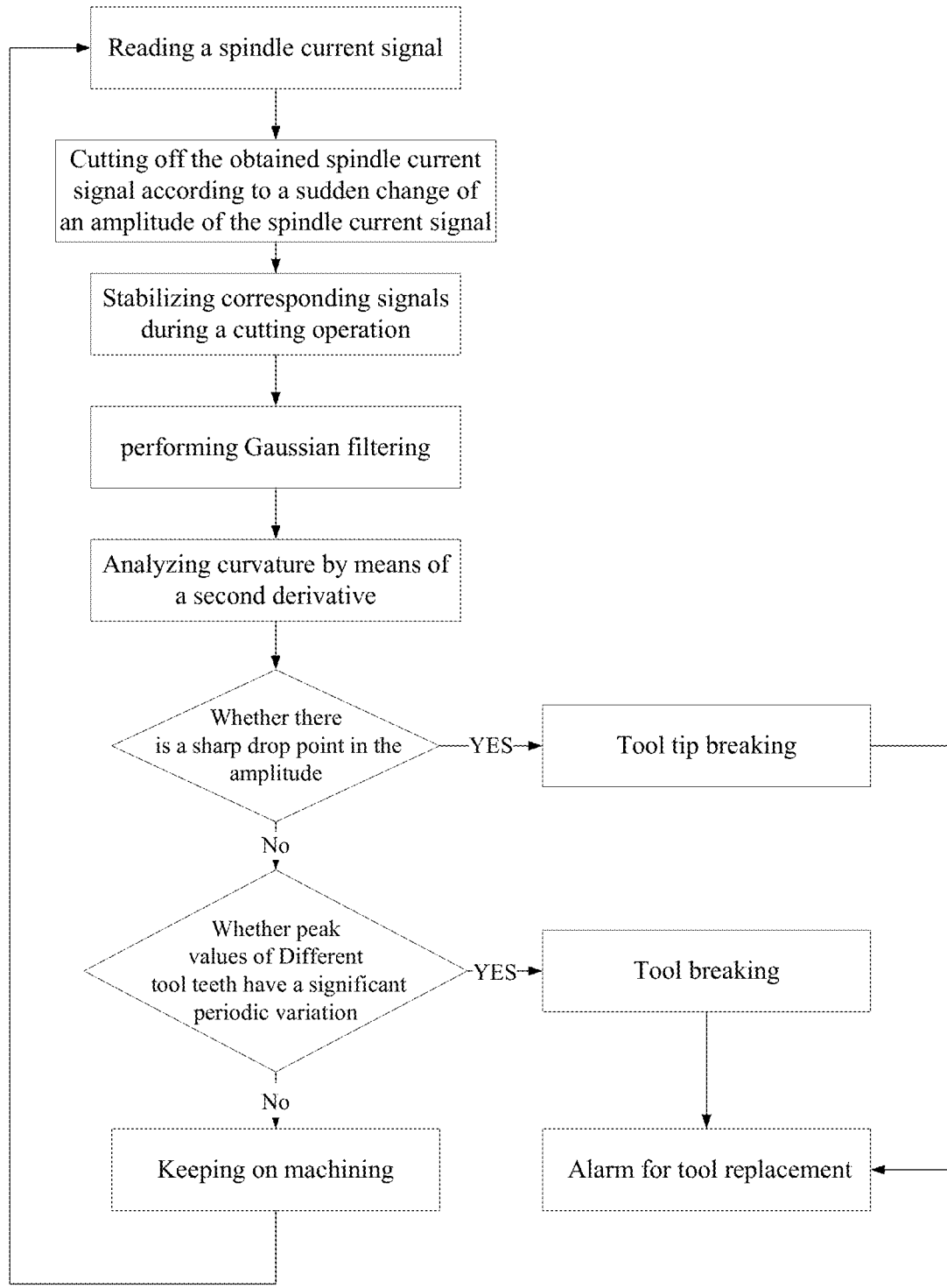
FIG. 4 is a flow chart of a method for determining an edge chipping state and a breaking state of the tool according to a spindle current signal of the present disclosure.

FIG. 4 shows a flow chart of a method for determining the edge chipping state and the breaking state of the tool according to the spindle current signal during the cutting operation of the present disclosure. As shown in FIG. 4, the real-time on-machine monitoring system for the failure state of the rotating tool responds significant failures such as tool edge chipping and tool breaking in time by detecting the spindle current signal related to the wear state of the tool. An operating principle is as follows:

The Hall current sensor is controlled by the controller to start during the cutting operation to obtain the spindle current signal of the CNC machine tool;

The obtained spindle current signal is cut off according to a sudden change of an amplitude of the spindle current signal, and signal curves correspondingly formed when the tool cuts into a material and cuts out of the material are removed to retain signals generated during a stable cutting operation;

Gaussian filtering is performed on retained signals to eliminate an influence of noises;

A filtered waveform is analyzed by means of a second derivative, namely curvature, to determine whether there is a sharp drop point of the amplitude, or to determine whether peak values of different tool teeth has a significant periodic variation, where the former corresponds to the tool breaking, while the latter corresponds to the tool edge chipping.

If the tool breaking or the tool edge chipping occurs, machining is stopped, and the kernel program alarms on the CNC controller of the CNC machine tool via the communication interface of the controller to prompt the replacement of the tool.

Measured data related to the above detection process are all stored in a database of the kernel program; if the real-time on-machine monitoring system for the failure state of the rotating tool is accessed to the workshop LAN, the measured data can be transmitted to the tool data server for the remote backup.

The on-machine monitoring system or detection method for the failure state of the rotating tool of the present disclosure has the following advantages:

(1) The real-time on-machine monitoring system for the failure state of the rotating tool has sensitivity, universality, and high efficiency and can be used in the whole NC machining process to avoid scrapping of parts, caused by the tool failure, thus improving utilization of the tool and reducing machining cost. On one hand, before and after the cutting operation, high-accuracy detection and wear compensation can be quickly performed on the progressive wear of the rotating tool based on a single-camera vision monitoring device with a telecentric imaging principle. On the other hand, during the cutting operation, a sudden significant failure such as the tool edge chipping or the tool breaking can be responded in time according to the sensor signals related to the failure state of the tool; and in order to avoid a false alarm, it can also be checked visually and accurately by the single-camera vision monitoring device, so that the progressive wear and the sudden tool edge chipping or the tool breaking throughout the whole machining process can be sensitively responded in real time without being affected by tool type, workpiece shape, workpiece material, the tool, and machine tool type. Accordingly, the universality is achieved.

(2) The present disclosure adopts a double protection design of the positive air pressure and the pneumatic plunger, and has a reliable optical path protection. On one hand, the pressured air is introduced into the optical path between the optical window and the pneumatic plunger and flows outwards via the external fit clearance at the cylindrical surface of the pneumatic plunger. Due to the resistance of the interior positive pressure air flow, the oil mists, the cutting fluids, and the chips in the machining environment of the machine tool are prevented from entering the optical path, so that the optical window and other optical components are not prone to pollution. Accordingly, the positive pressure protection on the optical path between the optical window and the pneumatic plunger is formed. On the other hand, the pneumatic plunger is located outside the optical path, has the opening position and the closing position. When the pneumatic plunger is in the opening position, it allows the acquirement of the tool image. When the pneumatic plunger is in the closing position, it provides protection for the optical path. Based on the above design, the optical components can be prevented from being polluted in the harsh machining environment with the cutting fluids, the oil mists, and the chips, thus being able to operate reliably.

(3) The measured data are traceable. On one hand, the kernel program includes a database module capable of saving the tool data and the tool image during the measurement and supporting users to query. On the other hand, if the real-time on-machine monitoring system for the failure state of the rotating tool is accessed to the workshop LAN, the measured data can be transmitted to the tool data server for the remote backup.

Various embodiments of the present description have been described in a progressive way, each of which emphasizes the difference from the others, and among which the same and similar parts can be referred to each other.

The principles and implementation of the present disclosure have been described herein with specific examples, and the above embodiments are described for better understanding of the methods and core concepts of the present disclosure. Meanwhile, the detailed implementation and the application scope could be ameneded by those skilled in the art according to the teachings of this disclosure. In conclusion, the contents of this description shall not be construed as a limitation to the present disclosure.

What is claimed is:

1. An on-machine monitoring system for a failure state of a rotating tool, comprising a detector, a data processing controller, a tool data server, and a Hall current sensor, wherein
    the data processing controller is connected to the detector through a signal cable and also connected to a computer numerical control (CNC) controller, the tool data server, and the Hall current sensor; the Hall current sensor is configured to sense a spindle current signal; the detector is internally provided with a telecentric lens and a backlight source, the telecentric lens and the backlight source are configured to perform parallel projection on a tool to obtain image sequences of the tool during a rotation process of the tool, the image sequences of the tool are configured to show a variation trend of the tool in size; the size of the tool comprises a tool diameter and a tool length; the data processing controller is configured to monitor the failure state of the tool according to the image sequences of the tool and the spindle current signal; and the failure state of the tool comprises a wear state, a breakage state, an edge chipping state, and a breaking state of the tool;
    wherein the detector comprises a protective shell, a camera module, the telecentric lens, a 45° reflective mirror, an optical window, a pneumatic plunger, and an optical fiber sensor, wherein
    the optical fiber sensor comprises a transmitter of the optical fiber sensor and a receiver of the optical fiber sensor; the protective shell is a concave protective shell; a first side cavity of the concave protective shell is internally provided with the camera module, the telecentric lens, the 45° reflective mirror, the optical window, the pneumatic plunger, and the transmitter of the optical fiber sensor, a second side cavity of the concave protective shell is internally provided with the receiver of the optical fiber sensor; the transmitter of the optical fiber sensor and the receiver of the optical fiber sensor are symmetrically arranged with the tool as a center; and the backlight source is arranged in the second side cavity and configured to provide uniform back lighting illumination during imaging to form a tool image with light-dark contrast; and
    the telecentric lens is arranged at a lens mount of the camera module and has an axis parallel to an axis of the tool; the camera module and the telecentric lens are configured to obtain a parallel projection image of the rotating tool; the 45° reflective mirror is arranged on an upper portion of the telecentric lens and configured to turn an optical imaging path by 90°; the optical window is arranged at a reflecting end of the 45° reflective mirror and configured to seal the camera module, the telecentric lens, and the 45° reflective mirror; the pneumatic plunger at the same optical imaging path as the optical window has an axis perpendicular to a normal direction of a plane of the optical window and is configured to control the camera module to acquire the tool image and protect the optical imaging path.

2. The on-machine monitoring system for the failure state of the rotating tool according to claim 1, wherein pressured air is introduced into the optical imaging path between the optical window and the pneumatic plunger to form positive pressure protection on the optical imaging path between the optical window and the pneumatic plunger.

3. The on-machine monitoring system for the failure state of the rotating tool according to claim 2, wherein a connecting line between the transmitter of the optical fiber sensor and the receiver of the optical fiber sensor is perpendicular to the axis of the tool.

4. The on-machine monitoring system for the failure state of the rotating tool according to claim 2, wherein the detector further comprises a cleaning nozzle; and
    the cleaning nozzle is arranged on a surface of a concave area of the concave protective shell, corresponds to the tool and is configured to clean the tool before the imaging to remove residual chips or cutting fluids on the tool.

5. The on-machine monitoring system for the failure state of the rotating tool according to claim 4, wherein the concave area is provided with a pneumatic protective door.

6. The on-machine monitoring system for the failure state of the rotating tool according to claim 4, wherein the data processing controller comprises a computation module, a light source control module, and an air path control module, wherein
    the computation module, the light source control module, and the air path control module are successively connected through signal cables; the computation module and the light source control module are respectively connected to the signal cables; the computation module is further connected to the CNC controller, connected to the tool data server through a workshop network, connected to the Hall current sensor, and configured to control the Hall current sensor to acquire the spindle current signal.

7. The on-machine monitoring system for the failure state of the rotating tool according to claim 6, further comprising a cleaning air tube, a plunger air tube, and a positive pressure protection air tube, wherein
    the cleaning air tube is configured to connect the cleaning nozzle to the air path control module;
    the plunger air tube is configured to connect the pneumatic plunger to the air path control module; and
    the positive pressure protection air tube is configured to connect the pressured air in the optical imaging path to the air path control module.

8. The on-machine monitoring system for the failure state of the rotating tool according to claim 1, wherein the Hall current sensor is replaced with a cutting force sensor, a vibration sensor, or an acoustic emission sensor.

9. A detection method for a failure state of a rotating tool based on an on-machine monitoring system for a failure state of a rotating tool, wherein the on-machine monitoring system for the failure state of the rotating tool comprises a detector, a data processing controller, a tool data server, and a Hall current sensor, wherein the data processing controller is connected to the detector through a signal cable and also connected to a computer numerical control (CNC) controller, the tool data server, and the Hall current sensor; the Hall current sensor is configured to sense a spindle current signal; the detector is internally provided with a telecentric lens and a backlight source, the telecentric lens and the backlight source are configured to perform parallel projection on a tool to obtain image sequences of the tool during a rotation process of the tool, the image sequences of the tool are configured to show a variation trend of the tool in size; the size of the tool comprises a tool diameter and a tool length; the data processing controller is configured to monitor the failure state of the tool according to the image sequences of the tool and the spindle current signal; and the failure state of the tool comprises a wear state, a breakage state, an edge chipping state, and a breaking state of the tool;

wherein the detection method comprises:

step 1: turning on a power supply to make a kernel program in the computation module start automatically and wait for measurement, wherein the pneumatic plunger is normally closed, and the positive pressure protection is executed all the time;

step 2: running a measurement macro program in a main numerical control (NC) machining program by a machine tool operator in a manner of subroutine calling, and transferring parameters during calling the measurement macro program, wherein the transferred parameters indicate a specific cross section for measurement of the tool diameter;

step 3: controlling, by the measurement macro program, the tool to move to an initial detection point, wherein the initial detection point refers to a fixed position designated by a user and is located at an upper portion of the detector; controlling, by the measurement macro program, the tool to descend from the initial detection point to a concave measurement area in a middle of the shell, wherein a tip of the tool shields a laser beam emitted by the transmitter of the optical fiber sensor firstly during the descent of the tool to generate a step trigger signal at the receiver of the optical fiber sensor; sending the step trigger signal to the CNC controller of a CNC machine tool to trigger the measurement macro program to run a skip command G31; stopping the descent of the tool based on the skip command G31; and setting a first macro variable to 1 by the measurement macro program;

step 4: querying a value of the first macro variable by the kernel program, and under a condition that the value of the first macro variable is 1, controlling, by the air path control module, the cleaning nozzle to be opened via the cleaning air tube to clean the tool by spraying a pressured air flow; otherwise, keeping waiting;

step 5: controlling, by the measurement macro program, the tool to move to a detection position in front of a field of view of the telecentric lens, wherein the detection position is a focus of the field of view of the telecentric lens, and setting a second macro variable to 1 by the measurement macro program, simultaneously;

step 6: querying a value of the second macro variable by the kernel program, and under a condition that the second macro variable is 1, by the kernel program, controlling the camera module to be opened and turning on the backlight source through the light source control module; otherwise, continuing to clean the tool;

step 7: controlling, by the air path control module, the cleaning nozzle to be closed via the cleaning air tube and the pneumatic plunger to be opened via the plunger air tube, and performing the parallel projection by the camera module on the tool through the telecentric lens during rotation of the tool, to obtain the image sequences of the tool;

step 8: controlling, by the kernel program, the pneumatic plunger to be closed and the backlight source to be turned off through the data processing controller, after shooting is finished, and informing, by the kernel program, the measurement macro program to control the tool to return to the initial detection point, to finish the detection;

step 9: processing the image sequences of the tool, obtained by the camera module and the telecentric lens, by the kernel program to determine the tool length and the tool diameter, wherein the tool length and the tool diameter are used to determine the wear state and the breakage state of the tool;

step 10: acquiring the spindle current signal by means of the Hall current sensor; and step 11: determining the edge chipping state and breaking state of the tool according to the spindle current signal.

10. The detection method for the failure state of the rotating tool based on the on-machine monitoring system for the failure state of the rotating tool according to claim 9, wherein step 11 comprises:

controlling, by the data processing controller, the Hall current sensor to start during a cutting operation to obtain the spindle current signal of the CNC machine tool;

cutting off the spindle current signal according to a sudden change of an amplitude of the spindle current signal, and removing signal curves correspondingly formed when the tool cuts into a material and cuts out of the material to acquire remained signals;

performing Gaussian filtering on the remained signals to determine a filtered waveform; and analyzing the filtered waveform by utilizing a second derivative curvature, to determine whether the filtered waveform has a sharp drop point in the amplitude, or to determine whether peak values of different tool teeth have a significant periodic variation; wherein under a condition that the filtered waveform has the sharp drop point in the amplitude, determining that a tool breaking occurs; and under a condition that the peak values of the different tool teeth have the significant periodic variation, determining that a tool edge chipping occurs.

11. The detection method for the failure state of the rotating tool based on the on-machine monitoring system for the failure state of the rotating tool according to claim 9, wherein the detector comprises a protective shell, a camera module, the telecentric lens, a 45° reflective mirror, an optical window, a pneumatic plunger, and an optical fiber sensor, wherein the optical fiber sensor comprises a transmitter of the optical fiber sensor and a receiver of the optical fiber sensor; the protective shell is a concave protective shell; a first side cavity of the concave protective shell is internally provided with the camera module, the telecentric lens, the 45° reflective mirror, the optical window, the pneumatic plunger, and the transmitter of the optical fiber sensor, a second side cavity of the concave protective shell is internally provided with the receiver of the optical fiber sensor; the transmitter of the optical fiber sensor and the receiver of the optical fiber sensor are symmetrically arranged with the tool as a center; and the backlight source is arranged in the second side cavity and configured to provide uniform back lighting illumination during imaging to form a tool image with excellent-light-dark contrast; and the telecentric lens is arranged at a lens mount of the camera module and has an axis parallel to an axis of the tool; the camera module and the telecentric lens are configured to obtain a parallel projection image of the rotating tool; the 45° reflective mirror is arranged on an upper portion of the telecentric lens and configured to turn an optical imaging path by 90°; the optical window is arranged at a reflecting end of the 45° reflective mirror and configured to seal the camera module, the telecentric lens, and the 45° reflective mirror; the pneumatic plunger at the same optical imaging path as the optical window has an axis perpendicular to a normal direction of a plane of the optical window and is configured to control the camera module to acquire the tool image and protect the optical imaging path.

12. The detection method for the failure state of the rotating tool based on the on-machine monitoring system for the failure state of the rotating tool according to claim 11, wherein step 11 comprises:

controlling, by the data processing controller, the Hall current sensor to start during a cutting operation to obtain the spindle current signal of the CNC machine tool;

cutting off the spindle current signal according to a sudden change of an amplitude of the spindle current signal, and removing signal curves correspondingly formed when the tool cuts into a material and cuts out of the material to acquire remained signals;

performing Gaussian filtering on the remained signals to determine a filtered waveform; and analyzing the filtered waveform by utilizing a second derivative curvature, to determine whether the filtered waveform has a sharp drop point in the amplitude, or to determine whether peak values of different tool teeth have a significant periodic variation; wherein under a condition that the filtered waveform has the sharp drop point in the amplitude, determining that a tool breaking occurs; and under a condition that the peak values of the different tool teeth have the significant periodic variation, determining that a tool edge chipping occurs.

13. The detection method for the failure state of the rotating tool based on the on-machine monitoring system for the failure state of the rotating tool according to claim 11, wherein pressured air is introduced into the optical imaging path between the optical window and the pneumatic plunger to form positive pressure protection on the optical imaging path between the optical window and the pneumatic plunger.

14. The detection method for the failure state of the rotating tool based on the on-machine monitoring system for the failure state of the rotating tool according to claim 13, wherein step 11 comprises:

controlling, by the data processing controller, the Hall current sensor to start during a cutting operation to obtain the spindle current signal of the CNC machine tool;

cutting off the spindle current signal according to a sudden change of an amplitude of the spindle current signal, and removing signal curves correspondingly formed when the tool cuts into a material and cuts out of the material to acquire remained signals;

performing Gaussian filtering on the remained signals to determine a filtered waveform; and analyzing the filtered waveform by utilizing a second derivative curvature, to determine whether the filtered waveform has a sharp drop point in the amplitude, or to determine whether peak values of different tool teeth have a significant periodic variation; wherein under a condition that the filtered waveform has the sharp drop point in the amplitude, determining that a tool breaking occurs; and under a condition that the peak values of the different tool teeth have the significant periodic variation, determining that a tool edge chipping occurs.

15. The detection method for the failure state of the rotating tool based on the on-machine monitoring system for the failure state of the rotating tool according to claim 11, wherein a connecting line between the transmitter of the optical fiber sensor and the receiver of the optical fiber sensor is perpendicular to the axis of the tool.

16. The detection method for the failure state of the rotating tool based on the on-machine monitoring system for the failure state of the rotating tool according to claim 15, wherein step 11 comprises:

controlling, by the data processing controller, the Hall current sensor to start during a cutting operation to obtain the spindle current signal of the CNC machine tool;

cutting off the spindle current signal according to a sudden change of an amplitude of the spindle current signal, and removing signal curves correspondingly formed when the tool cuts into a material and cuts out of the material to acquire remained signals;

performing Gaussian filtering on the remained signals to determine a filtered waveform; and analyzing the filtered waveform by utilizing a second derivative curvature, to determine whether the filtered waveform has a sharp drop point in the amplitude, or to determine whether peak values of different tool teeth have a significant periodic variation; wherein under a condition that the filtered waveform has the sharp drop point in the amplitude, determining that a tool breaking occurs; and under a condition that the peak values of the different tool teeth have the significant periodic variation, determining that a tool edge chipping occurs.

17. The detection method for the failure state of the rotating tool based on the on-machine monitoring system for the failure state of the rotating tool according to claim 11, wherein the detector further comprises a cleaning nozzle; and the cleaning nozzle is arranged on a surface of a concave area of the concave protective shell, corresponds to the tool and is configured to clean the tool before the imaging to remove residual chips or cutting fluids on the tool.

18. The detection method for the failure state of the rotating tool based on the on-machine monitoring system for the failure state of the rotating tool according to claim 17, wherein the concave area is provided with a pneumatic protective door.

19. The detection method for the failure state of the rotating tool based on the on-machine monitoring system for the failure state of the rotating tool according to claim 17, wherein the data processing controller comprises a computation module, a light source control module, and an air path control module, wherein the computation module, the light source control module, and the air path control module are successively connected through signal cables; the computation module and the light source control module are respectively connected to the signal cables; the computation module is further connected to the CNC controller, connected to the tool data server through a workshop network, connected to the Hall current sensor, and configured to control the Hall current sensor to acquire the spindle current signal.

* * * * *